US008572740B2

(12) United States Patent
Mashevsky et al.

(10) Patent No.: US 8,572,740 B2
(45) Date of Patent: Oct. 29, 2013

(54) METHOD AND SYSTEM FOR DETECTION OF PREVIOUSLY UNKNOWN MALWARE

(75) Inventors: Yury V. Mashevsky, Moscow (RU); Yury V. Namestnikov, Moscow (RU); Nikolay V. Denishchenko, Moscow (RU); Pavel A. Zelensky, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 821 days.

(21) Appl. No.: 12/645,523

(22) Filed: Dec. 23, 2009

(65) Prior Publication Data
US 2011/0083180 A1 Apr. 7, 2011

(30) Foreign Application Priority Data

Oct. 1, 2009 (RU) .................................. 2009136233

(51) Int. Cl.
 G06F 12/14 (2006.01)
 H04L 29/06 (2006.01)
(52) U.S. Cl.
 CPC ..................................... H04L 63/145 (2013.01)
 USPC .................................. 726/24; 726/22; 726/23
(58) Field of Classification Search
 None
 See application file for complete search history.

(56) References Cited

U.S. PATENT DOCUMENTS

| 5,801,702 | A  | * | 9/1998  | Dolan et al. ................. 715/854 |
| 6,021,438 | A  |   | 2/2000  | Duvvoori et al. |
| 6,789,088 | B1 |   | 9/2004  | Lee et al. |
| 7,392,544 | B1 | * | 6/2008  | Pavlyushchik ................. 726/24 |
| 7,472,420 | B1 | * | 12/2008 | Pavlyushchik ................. 726/24 |
| 7,483,972 | B2 |   | 1/2009  | Bhattacharya |
| 7,624,448 | B2 |   | 11/2009 | Coffman |
| 2003/0131256 | A1 | * | 7/2003 | Ackroyd ........................ 713/201 |
| 2004/0102923 | A1 |   | 5/2004 | Tracy et al. |
| 2006/0059212 | A1 | * | 3/2006 | Carro ............................. 707/205 |
| 2006/0212852 | A1 | * | 9/2006 | Hwang ........................... 717/127 |
| 2006/0236392 | A1 | * | 10/2006 | Thomas et al. ................. 726/23 |
| 2007/0016953 | A1 | * | 1/2007 | Morris et al. .................... 726/24 |
| 2007/0156895 | A1 |   | 7/2007 | Vuong |
| 2007/0174704 | A1 |   | 7/2007 | Shih |
| 2007/0226248 | A1 |   | 9/2007 | Darr |
| 2008/0168558 | A1 |   | 7/2008 | Kratzer et al. |
| 2008/0196099 | A1 |   | 8/2008 | Shastri |
| 2008/0288827 | A1 |   | 11/2008 | Chagoly et al. |
| 2008/0320075 | A1 |   | 12/2008 | Livshits et al. |

(Continued)

FOREIGN PATENT DOCUMENTS

WO WO0277758 3/2002
WO WO03077071 3/2003

(Continued)

*Primary Examiner* — Matthew Henning
(74) *Attorney, Agent, or Firm* — Bardmesser Law Group

(57) ABSTRACT

A system, method and computer program product for detection of the previously unknown malware, the method comprising: (a) receiving event information and file metadata from a remote computer; (b) identifying whether the event information or the file metadata are indicative of the already known malware presence, indicative of the unknown malware presence, or indicative of malware absence; (c) if the event information or the file metadata are indicative of the known malware or indicative of malware absence, filtering out the event information and the file metadata; (d) performing a risk analysis and risk assessment for the remaining event information and the remaining file metadata to determine if the event and the file metadata are indicative of the previously unknown malware presence; and (e) where performing a risk analysis and risk assessment includes a "parent-child" hierarchy of the files, and the risk assessed to the parent is based on the risk associated with the child.

17 Claims, 7 Drawing Sheets

(56) References Cited

U.S. PATENT DOCUMENTS

| | | | |
|---|---|---|---|
| 2009/0024991 A1 | 1/2009 | Campbell et al. | |
| 2009/0049553 A1* | 2/2009 | Vasudeva | 726/25 |
| 2009/0083852 A1 | 3/2009 | Kuo et al. | |
| 2009/0158430 A1* | 6/2009 | Borders | 726/23 |
| 2010/0132038 A1* | 5/2010 | Zaitsev | 726/22 |

FOREIGN PATENT DOCUMENTS

| | | |
|---|---|---|
| WO | WO2007016478 | 7/2006 |
| WO | WO2007066333 | 12/2006 |
| WO | WO2008008046 | 7/2007 |
| WO | WO2008036381 | 9/2007 |
| WO | WO2008091982 | 1/2008 |

* cited by examiner

METHOD AND SYSTEM FOR DETECTION OF PREVIOUSLY UNKNOWN MALWARE

CROSS-REFERENCE TO RELATED APPLICATIONS

This application claims priority to Russian Patent Application no. 2009136233, filed on Oct. 1, 2009, which is incorporated herein by reference in its entirety.

BACKGROUND OF THE INVENTION

1. Field of the Invention

The present invention is related to anti-malware technology, and more particularly, to detection of unknown malware threats based on real-time automatic event and analysis of behavioral patterns of objects.

2. Description of the Related Art

The ongoing proliferation of malicious programs causes substantial damage to computers worldwide. The existing methodology of providing protection to stand-alone personal computers, as well as to corporate networks, centers primarily on dealing with already known computer threats.

The antivirus programs in existence since the late 1980s traditionally detect viruses and related hostile software in two ways: (1) Files are scanned for binary code strings matching those of the known viruses ("virus signatures") and (2) Files are scanned for the known virus-like code ("heuristic scanning"). Other techniques involve either blocking virus-like behavior ("behavior blocking") or checking files for some modifications ("integrity checking").

U.S. Pat. No. 6,016,546 discloses a method of detecting the probability of the presence of any of a first set of known data traits in the data string by use of a second set of generic features and a third set of signatures where the generic features and the signatures are typical of the first set of data traits.

U.S. Pat. No. 6,338,141 discloses a method that may be performed on a stand-alone computer system in real time or on a networked machine. The method uses a collection of relational data to detect computer viruses in the computer files. This collection of relational data comprises various relational signature objects created from viruses. Computer files being checked for viruses are run through a process that creates relational signature objects. After the signature objects have been created as a result of file scan, they are checked against the collection of relational data, and, depending on the results, the file may be deemed infected and prohibited from running on the system.

However, this approach of dealing with viruses can identify a malicious object only after malicious object has already entered the computer system or one of the nodes on the network, and it is ineffective against unknown threats with new unknown signatures, or against computer viruses exhibiting unknown behavioral patterns.

Accordingly, there is a need in the art for a system and method for a more effective, proactive approach for detection of unknown computer threats before an unknown virus enters the computer system protected or computer network and becomes a problem.

SUMMARY OF THE INVENTION

The present invention is intended as a method and system for detection of unknown malware performing a risk analysis and a risk assessment based on various criteria that substantially obviates one or several of the disadvantages of the related art.

In one aspect of the invention there is provided a system, method, and computer program product for detection of previously unknown malware, the method comprising: (a) receiving event information and file metadata from a remote computer; (b) identifying whether the event information or the file metadata is indicative of the known malware, indicative of the unknown malware, or indicative of malware absence; (c) if the event information or the file metadata is indicative of the known malware or indicative of malware absence, filtering out the event information and the file metadata; (d) performing a risk analysis and a risk assessment for the remaining event information and the remaining file metadata to determine if the event and the file metadata are indicative of the previously unknown malware presence; and (e) performing a risk analysis and risk assessment wherein the said risk analysis and risk assessment include construction of a "parent-child" hierarchy based on invocation of the files, wherein the risk assessed to the parent is based on the risk associated with the child.

The file metadata can be, any of file name, file extension, file size, file linking status, whether irrespective of the file is digitally signed, a download utility, packed, file source, file invocation frequency, file path, the URL from which the file was received and a port the file is accessing.

The event information being analyzed may include information on behavioral patterns of an object or, statistical data associated with the event, name stability of the object source, IP address stability of the object source, activity of the object, and the information regarding the type of the event, such as file downloading, file dropping and file linking, etc.

The system is capable of performing an automated detection of the previously unknown malware in real time or may perform a multistage analysis for the presence of such malware in cooperation with human analysts.

The system maintains a so-called WhiteList of objects known or considered to be safe, and a so-called BlackList of objects known or determined to be malicious.

Once a file has been added to the BlackList, the antivirus software installed on the user's computer begins detecting the object as malicious and defends the user's computer from the malicious object. The antivirus software also blocks the user's access to domains and URLs placed on the BlackList. With respect to the domains, the system also calculates a parameter called "Reputation" which shows a degree of danger accessed a given Internet resource.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide a further explanation of the invention as claimed.

BRIEF DESCRIPTION OF THE ATTACHED FIGURES

The accompanying drawings, which are included to provide further understanding of the invention constitute a part of this specification, illustrate embodiments of the invention and, together with the description, serve to explain the principles of the invention.

DETAILED DESCRIPTION OF THE PREFERRED EMBODIMENTS

Figure 1:
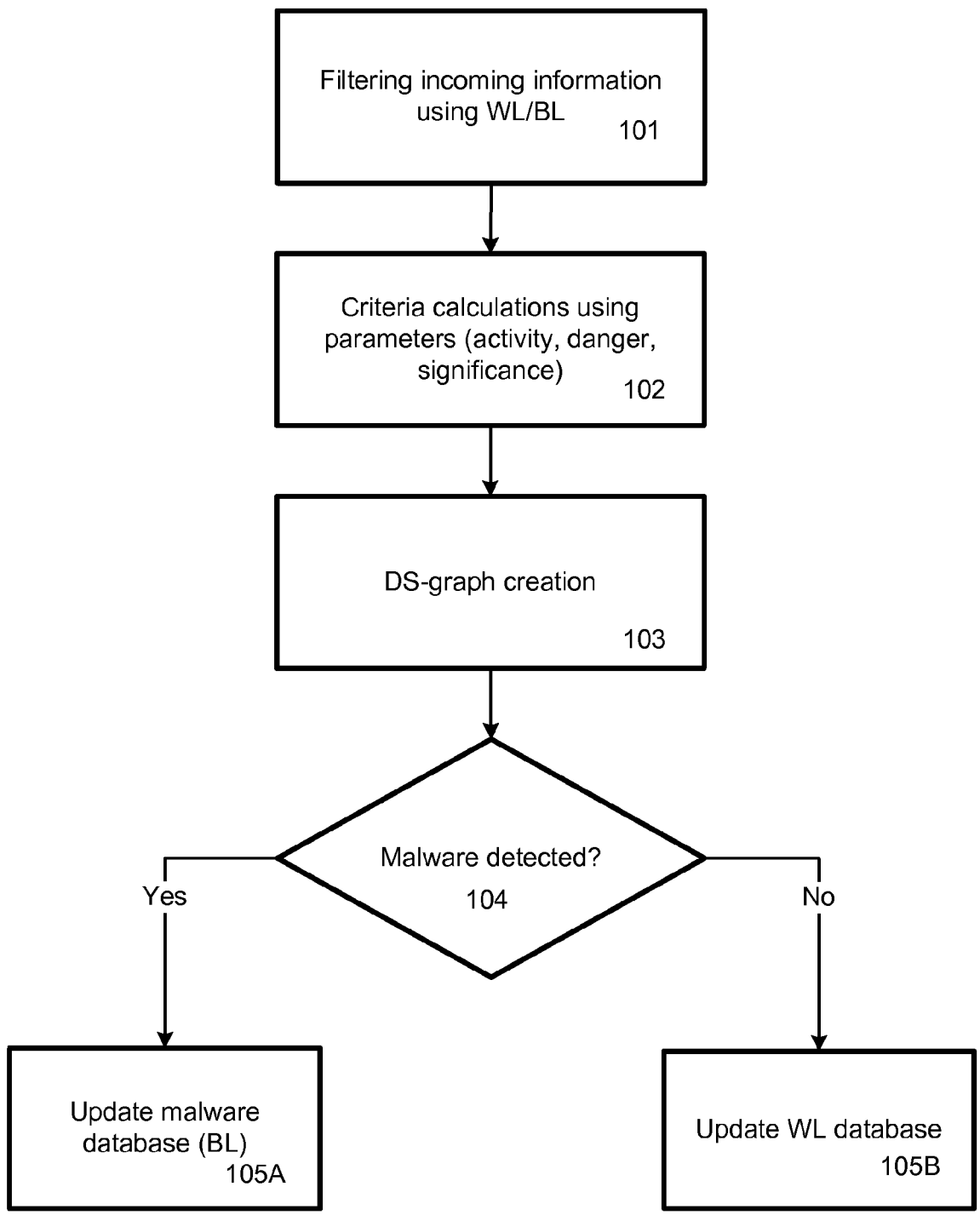
FIG. 1 illustrates a flow chart of the unknown threat detection of one embodiment of the invention.

Reference will now be made in detail to the preferred embodiments of the present invention, examples of which are illustrated in the accompanying drawings.

The present invention is intended as a method and system for detection of the following categories of previously unknown malware:
Malicious programs
Potentially-undesirable programs
Malicious web-sites
Roguish web-sites
The messages transmitted via E-mail, IM, public networks, etc., containing malicious objects or links thereto.
The remaining types of computer threats, such as Internet-based attacks, unwanted banners, unwanted content (pornography, gambling, drugs and alcohol related advertisements), etc.

The system remotely tracks the files invoked by various applications being executed on a user's computer to test the executable files for malware presence and thereby substantially obviates one or several of the disadvantages of the related prior art.

In one embodiment of the invention, a system and method for detection of unknown threats is proposed. An exemplary system may include a part of the Kaspersky Security Network, KSN, as provided and maintained by Kaspersky Lab, and a number of users connecting to the KSN during the normal daily use of their respective computers.

Prior to connecting to the KSN, each user installs on his or her computer an antivirus program provided in an exemplary embodiment by Kaspersky Lab. The antivirus product operates in the background and reports to the KSN any activity that could be potentially harmful to the user's computer system. This activity might be a user accessing or downloading a particular file for the first time, or an executable file invoked on a user's computer, or a user connecting to an unfamiliar Internet resource, such as a website that might be spreading malicious files, etc.

The information collected by the KSN includes event information and object information. Event information describes particular types of events taking place on the computers of remote users such as instances of object downloads, object dropping, file linking, file invocation. Event information may also include statistical data associated with the event, name stability of the object source, IP address stability of the object source, activity of the object and some behavioral patterns of the object associated with the event. Object information collected by KSN includes file metadata describing a particular file, such as file name, file extension, file size, file linking status, whether the file is digitally signed, whether the file is an executable file, download utility or whether the file is packed, a file source, file invocation frequency, file path, the URL from which the file was received and a port the file is accessed. With respect to the collected information, the KSN maintains a knowledge base (WhiteList, or WL) of events and objects that are known to be benign, or "clean", or are deemed unlikely to be malicious. The KSN also maintains a knowledge base (BlackList, or BL) of events and objects that are known to be malicious or are deemed likely to be malicious.

The system is also capable of protecting users against links to malicious URLs distributed to the user through Instant Messengers (IM). Based on the information stored in the KSN's databases, certain contacts distributing IMs may be judged to be untrustworthy. Hypertext links received through IMs from untrustworthy contacts are detected by the system, and the system makes a decision whether the link is of a malicious nature and places the link target on the BlackList.

A high level flowchart describing processing of information received from the participating users is illustrated in FIG. 1. During the first stage of processing, the incoming information regarding various events and file metadata, reported by the users, is filtered using the information stored in WL and BL knowledge databases (step 101). The filtering algorithm checks both WL and BL for the presence of any data regarding the incoming event information and object information, and filters out the known event information and object information.

The remaining information is processed by the system, which performs a risk analysis and risk assessment for the remaining event information and the remaining file metadata to determine if the event and the file metadata are indicative of previously unknown malware presence. These risk analysis and risk assessment are performed in real time in step 102. The risk analysis is performed using various criteria and various techniques to determine risks (for example, URL-based analysis is one risk factor, the file size analysis is another factor, and so on). The risk assessment is performed by aggregating different metrics to determine, for example, whether the risk is high, medium or low. Various parameters, such as Activity, Danger, Significance are calculated and used in creation of Download-Starter graph (DS-graph) in step 103.

Based on the analysis of the DS-graph, the system decides if malware event or object has been detected. If a malicious object or event has been encountered, of if it has been determined that it is the case with a high degree of certainty, the BL is updated with the information on this previously unknown threat in step 105A. However, if the event information or object information are determined to be benign, the system updates the WL accordingly in step 105B.

Figure 2:
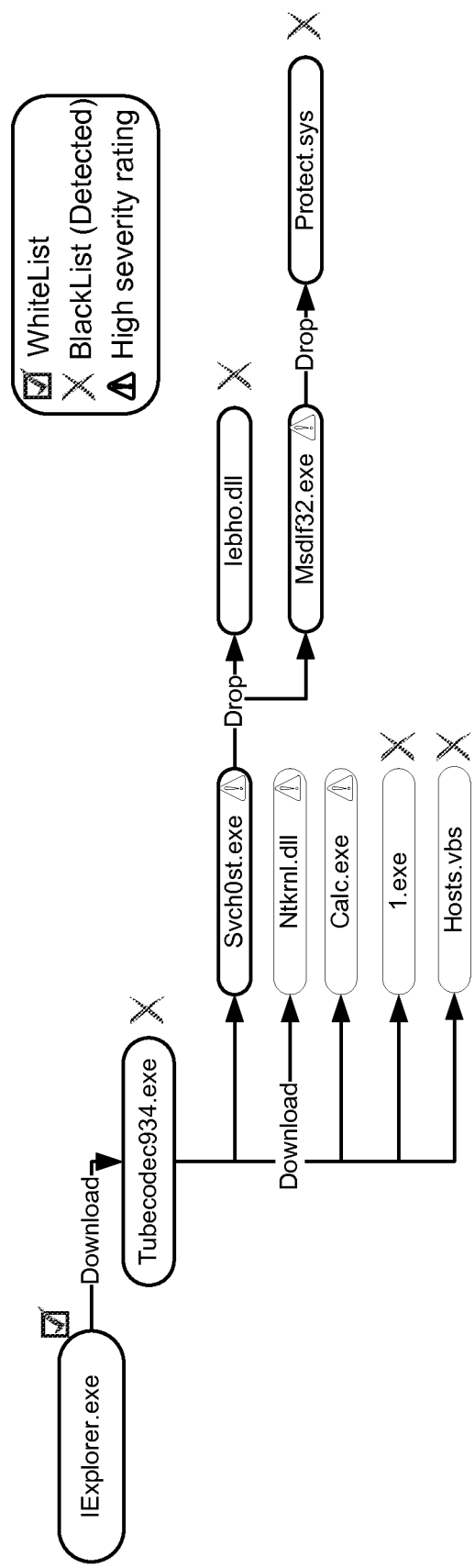
FIG. 2 illustrates an exemplary DS-chart (Download-Starter chart) created for identification of one type of unknown threat.

An example of a DS-graph created in step 103 of FIG. 1 is illustrated in FIG. 2. In the last few years, malicious programs with a Trojan-Dropper and Trojan-Downloader type of behavior have become widespread. Trojans-Droppers are used to install other malware on victim machines without the knowledge of the user. Droppers install their payload either without displaying any notification or displaying a false message about an error in an archived file or in the operating system. The new malware is dropped to a specified location on a local disk and then launched. The dropper functionality contains a code to install and execute all of the payload files. Trojan-Downloader downloads and installs a new malware or adware on the victim machine. The downloader then either launches the new malware or registers it to enable an auto run according to the local operating system requirements. All of this is done without the knowledge or consent of the user. The names and locations of malware to be downloaded are either coded into the Trojan or downloaded from a specified website or other Internet location.

Consider an example when a user invokes a browser and downloads an executable file Tubecodec934.exe. This event is reported to the KSN. Upon execution, Tubecodec934.exe downloads several other files, and these events are reported to the KSN as well. In this case, Tubecodec934.exe. is a "parent" to five files: Svch0st.exe, Ntkrnl.dll, Calc.exe, 1.exe and Hosts.vbs, which are the "children" files of Tubecodec934.exe. The system proceeds to perform real time risk analysis and risk assessment, which includes construction of a "parent-child" hierarchy based on the invocation sequence of the files. The risk assessed to the "parent" file is based on the risk associated with the "child" or "children" of this file. In this case, the KSN databases do not have any information for the first three of these files and the KSN's analytical modules begin performing the analysis of these files in order to assess a level of danger associated with these files. In order to detect the unknown threats represented by "parents" and "children", the system builds a graph representation analogous to the one shown in FIG. 2.

Once the graph is built, the system calculates for every "parent" a so-called X-factor. The X-factor defines the level of danger of a given "parent" and is based on the data about its "children". The X-factor shows to what type of programs a given object tends: for example, to the file managers or to a Trojan-dropper, to browsers and legitimate downloads or to a Trojan-downloader.

Another method for assessing a level of danger of a given executable file is to analyze the ratio of "clean" to malicious programs the file invokes. As an example, it would be obvious to anyone of ordinary skills in the art that the file "explorer.exe", an executable file of a well-known browser, invokes "clean" files than malicious ones, and therefore would have a very low level of danger.

The system also calculates parameters describing the level of activity, the degree of danger and the significance for every element of the graph. The parameter "Significance" is a function that takes into account the level of activity and the degree of danger of an event and is calculated as follows: Significance=(Activity*Danger). The parameter "Activity" is calculated based on the data regarding the number of downloads or the number of times a given object is invoked over a certain period of time. A particular algorithm is used to reduce this parameter to a form convenient for the analysis.

Using this algorithm, the "Activity" of the objects is reduced to a certain form of a probability distribution. This allows to reduce the significance of events that took place a long time ago and reveal the trends of variation of this parameter.

The parameter "Activity" is calculated as follows: Activity=Hits*F($\Delta$t), where "Hits" is the number of downloads, program starts, net attack attempts etc., and $\Delta$t is the period of time since the occurrence of the last event. However, a high activity of a program is not necessarily by itself an indication that this program is malicious, as the trend of activity can also be taken into consideration (See Table 1 below).

Examples of "Activity" calculations performed by the system are provided in Table 1.

TABLE 1

Activity calculation and trend analysis

| # | Total Hits | Increase | $\Delta$t, min | Activity | Trend |
|---|---|---|---|---|---|
| 1 | 10 | 10 | 0 | 10 | Rise |
| 2 | 25 | 15 | 15 | 27.5 | Rise |
| 3 | 80 | 55 | 15 | 68.75 | Rise |
| 4 | 165 | 85 | 15 | 129.38 | Rise |
| 5 | 245 | 80 | 15 | 138.69 | Stable |
| 6 | 316 | 71 | 15 | 140 | Stable |
| 7 | 336 | 20 | 15 | 92.7 | Fall |
| 8 | 351 | 15 | 15 | 61.4 | Fall |
| 9 | 352 | 1 | 105 | 19 | Fall |
| 10 | 353 | 1 | 175 | 1.73 | Fall |

The parameter "Danger" is calculated based on the so-called decision tree of weight coefficients, the majority of which dynamically changes depending on the accumulated information in the knowledge database. A tree of weight coefficients is a result of testing of various criteria which were developed in the inventor's anti-virus laboratory for various types of detected objects.

Detailed examples of calculating "Danger" are presented below.

Example 1

Figure 3:
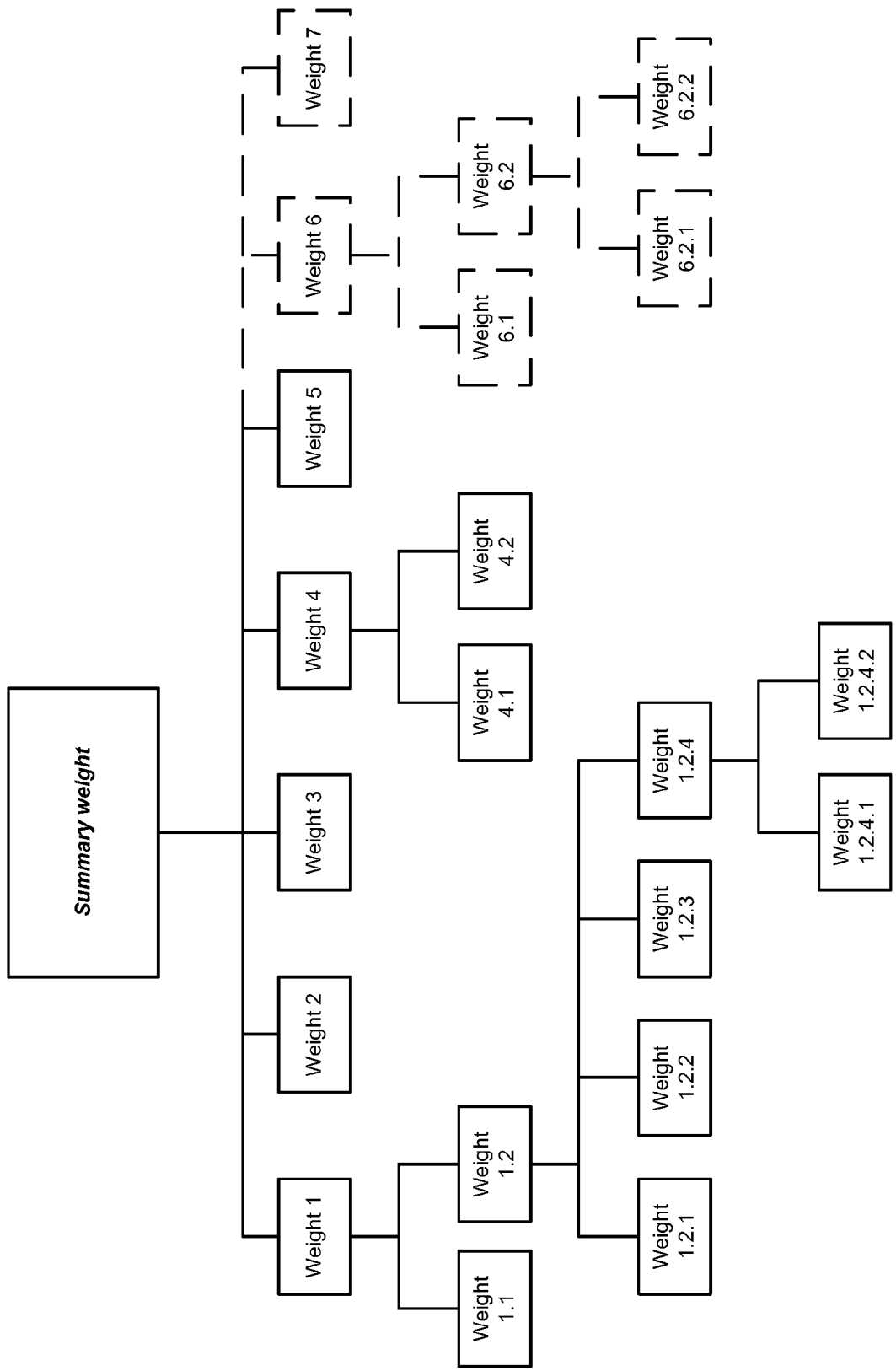
FIG. 3 illustrates a tree of exemplary weight coefficients created as a result of evaluation of various criteria according to one embodiment of the invention.

In this example, illustrated in FIG. 3, the system receives a notification message that an executable file http:**soho.com.server911.ch/us/us 1exe.jpg with a hash value MD5=0x12A91C1CB575D154BAA9AAD1759F6EC8 has been downloaded by a user. Upon processing of this message, as part of the risk analysis and risk assessment, the system will build a decision tree from a multitude of criteria, each criterion implementing a particular logic. For example, a criterion from the group of tests that checks the host name and determines the presence of masking, will be assigned the maximum weight of 100 since the name of the host incorporates the host from the white list, soho.com. Another criterion that checks for presence of double extensions will be assigned the weight of 92, since this executable file has two extensions, exe and jpg, and is masquerading as a popular image format.

The maximum weight would have been assigned if these two file extensions were separated by a blank space.

The "Danger" of the object is numerically equal to the aggregate of the weight coefficients of the decision tree.

Example 2

The system receives a notification that an executable file has been downloaded. If this is the first message referencing this object, the system will build a decision tree.

Figure 4:
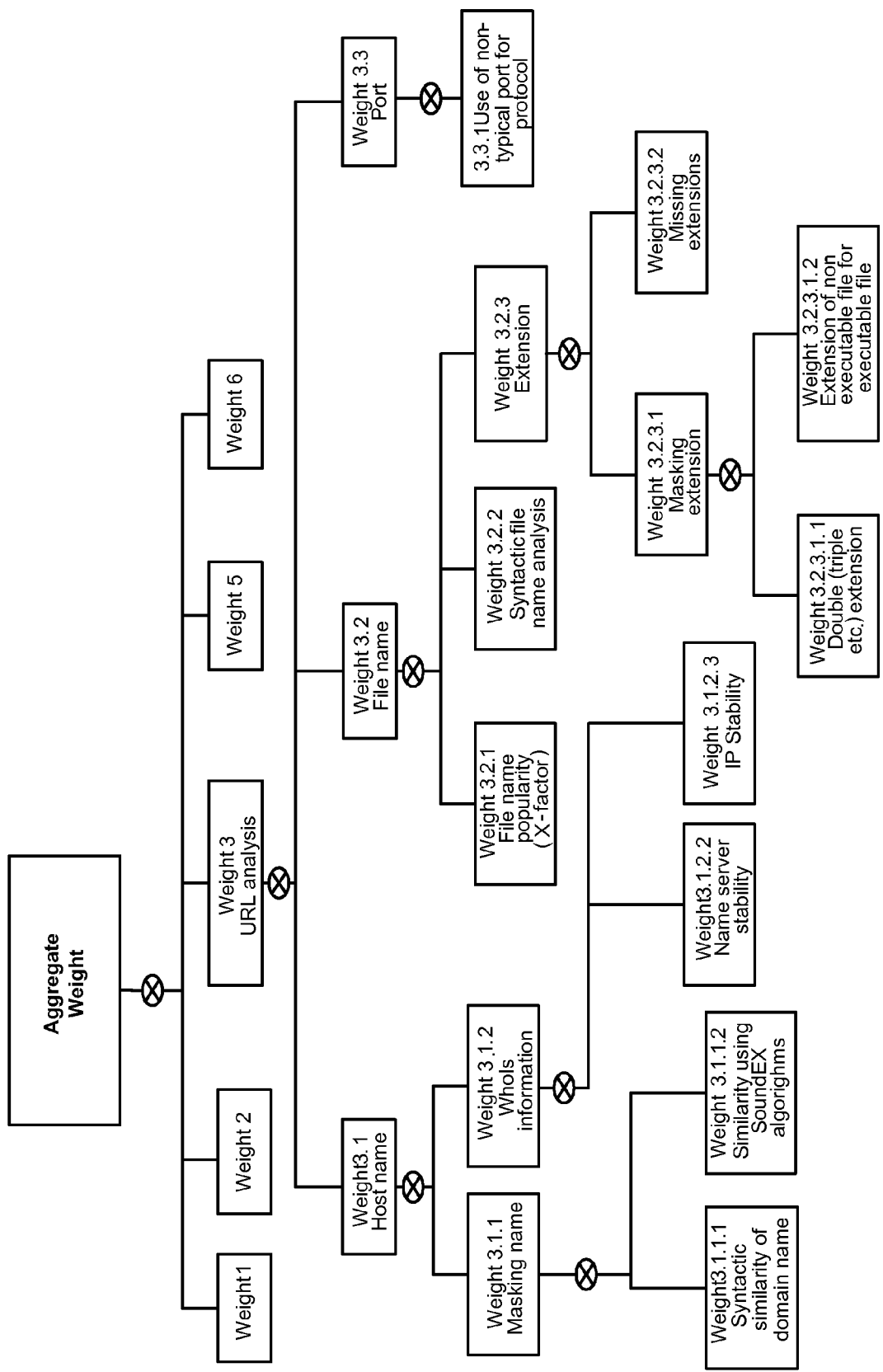
FIG. 4 illustrates a diagram of an aggregate weight calculation according to one embodiment of the invention.

Let's consider a branch of the criteria responsible for the analysis of the URL. Suppose the URL field of the data packet received is URL=http:**yahoo.com.server911.ch/us/us^; 2.exejpg. Each part of this URL string (the domain name, the host, the filename, port, etc.) is analyzed using a specific criterion, resulting in a decision tree shown in FIG. 4.

Taking apart the host name (yahoo.com.server911.ch), the system will identify an attempt of the URL to masquerade as a domain from the WhiteList "yahoo.com". The criterion 3.1.1.1 will be assigned a weight of 80.

The part of the string Server911.ch does not match any known domains and therefore the weight of the criterion "Similarity with SoundEX-algorithm" will be equal to 0.

The resulting weight of the criterion "(Masking, Disguise, Disguising, Camouflage) Name" $W_{3.1.1}=F(w_{3.1.1.1}, w_{3.1.1.2})=$ 80.

Every time an Internet resource or new domain is registered, the registering party is obliged to provide certain information, such as an e-mail address and additional mandatory information. This registration information may be used by the KSN to identify the resources engaged in spreading malware. The system will check if there is any history of spreading malicious files associated with the e-mail address of the registering party. Even though in some cases the e-mail address could be fictitious, most of the registration authorities require the e-mail address verification prior to registering the resource.

The system will also check the lifespan of the resource. Many authors of malicious software take advantage of free trial periods offered by registration authorities. They register many websites at the same time, redirect as much traffic as possible to these websites and spread as much malware as possible until the free trial period expires and the websites are automatically closed.

Some registration authorities offer proxy domain registration by the authority itself and the KSN uses "registration by proxy" as an indicator that the domain might be associated with malicious websites.

Obtaining the registration information from the service WhoIs (or similar), the system can determine that this domain has been in existence for only 6 days, and during that time the name of the server and the IP address changed three times. This type of behavior is characteristic of malicious websites and consequently the criteria "Stability of Nameserver" and "Stability of IP address" will be assigned the weights of 70 and 75, respectively.

The resulting weight of criterion "WhoIs Information" is equal to $W_{3.1.2}=F(w_{3.1.2.2}, w_{3.1.2.3})=87$. The system then calculates the aggregate weight for "Host name": $W_{3.1}=F(W_{3.1.1}, W_{3.1.2})=93$.

The filename "usˆ;2" is not popular, neither among malicious programs, nor among clean files. Because of that the criterion (3.1.1.2) will not provide any contribution to the aggregate weight. The presence of the character string "ˆ;" in the name of the file is not typical of clean objects and suggests a random generation of a filename. Therefore, the criterion 3.2.2 will be assigned a weight of 43.

The sum of the criteria for testing the disguised extensions (3.2.3.1.1 and 3.2.3.1.2) will have a weight of 92. The file being checked is an executable file and has two extensions (3.2.3.1.1). Furthermore, the second extension, jpg, indicates an attempt to camouflage the file as an image file. The maximum weight value would be achieved if the two extensions were separated by a blank space. The object has an extension and therefore the weight of the criterion "Missing extension" is equal to zero. Based on the above, the aggregate weight of all the criteria evaluating the filename is $W_{3.2}=95$.

In this case the port is not specified which means that a standard HTTP protocol port is used and not suspicious. Therefore, the weight $W_{3.3}$ of the criterion "Port" is equal to zero.

The resulting value for the criterion "Analysis of the URL string" $W_3=F(w_{3.1}, w_{3.2}, w_{3.3})=98$ and indicates that the probability that this URL hosts a malicious object is 0.98, or 98%.

Example 3

Referring back to FIG. 4, consider another example of calculating "Danger". The system receives a notification message that an executable file identified as the Trojan-Downloader.Win32.Agent.yyy has been downloaded from a domain listed in the WhiteList. In order to resolve this conflict, the system will build a decision tree.

Below, additional detail for a branch of the criteria responsible for the analysis of the URL is described. Suppose the URL field of the data packet received is URL=http:**www.nokia.com/files/support/nseries/phones/software/Nokia_Lifeblog_2_5_224_en_uk.exe. Each part of this URL string (domain name, host name, filename, port, etc.) is analyzed using a particular criterion.

Taking apart the host name http:**www.nokia.com, the system will determine that there is no attempt to disguise the domain as a domain the WhiteList. Therefore, the criteria 3.1.1.1 and 3.1.1.2 will have a weight of zero, resulting in the aggregate weight for the criterion "Disguising Name" $W_{3.1.1}=F(W_{3.1.1.1}, W_{3.1.1.2})=0$.

Obtaining the registration information from the service WhoIs, the system will determine that this domain has been in existence for the past 18 years, and during that time the nameserver never changed, and the IP address changed once in the past 4 years. This type of behavior is characteristic of clean websites and consequently the criteria "Stability of Nameserver" and "Stability of IP address" will be assigned the weights of 0 and 1, respectively.

The result weight of criterion "WhoIs Information" is equal $W_{3.1.2}=F(W_{3.1.2.2}, W_{3.1.2.3})=1$. The system then calculates the aggregate weight for "Host name": $W_{3.1}=F(W_{3.1.1}, W_{3.1.2})=1$.

The filename "Nokia_Lifeblog_2_5_224_en_uk" is not popular among malicious programs. Owing to that, the criterion (3.1.1.2) will not provide any contribution to the aggregate weight.

The filename comprises characters that do not raise any suspicion. The words forming the filename have meaning and are encountered in the names of "clean" programs. Therefore, the weight of the criterion 3.2.2 will be equal to zero.

The aggregate weight of the criteria for testing the disguised extensions (3.2.3.1.1 and 3.2.3.1.2) will have a value of 0 because the file being analyzed is executable, and has a typical extension—exe for executable files. Thus, $W_{3.2.3.1.1}=0$. The object have an extension and therefore the weight of the criterion "Missing extension" is equal to zero.

Based on the above, the aggregate weight of all the criteria evaluating the filename is $W_{3.2}=0$.

The port is not specified. This means that a standard HTTP protocol port is used which not suspicious. Therefore, the weight $W_{3.3}$ of the criterion "Port" is equal to zero.

The resulting weight for the criterion "Analysis of the URL string" $W_3=F(W_{3.1}, W_{3.2}, W_{3.3})=1$ indicates that the probability that this URL hosts a malicious object is negligibly small.

It is obvious that the remaining criteria of the decision tree will also have the minimal weight. The situation will be classified as a false alarm and the system will automatically correct the anti-virus knowledge databases.

Figure 5:
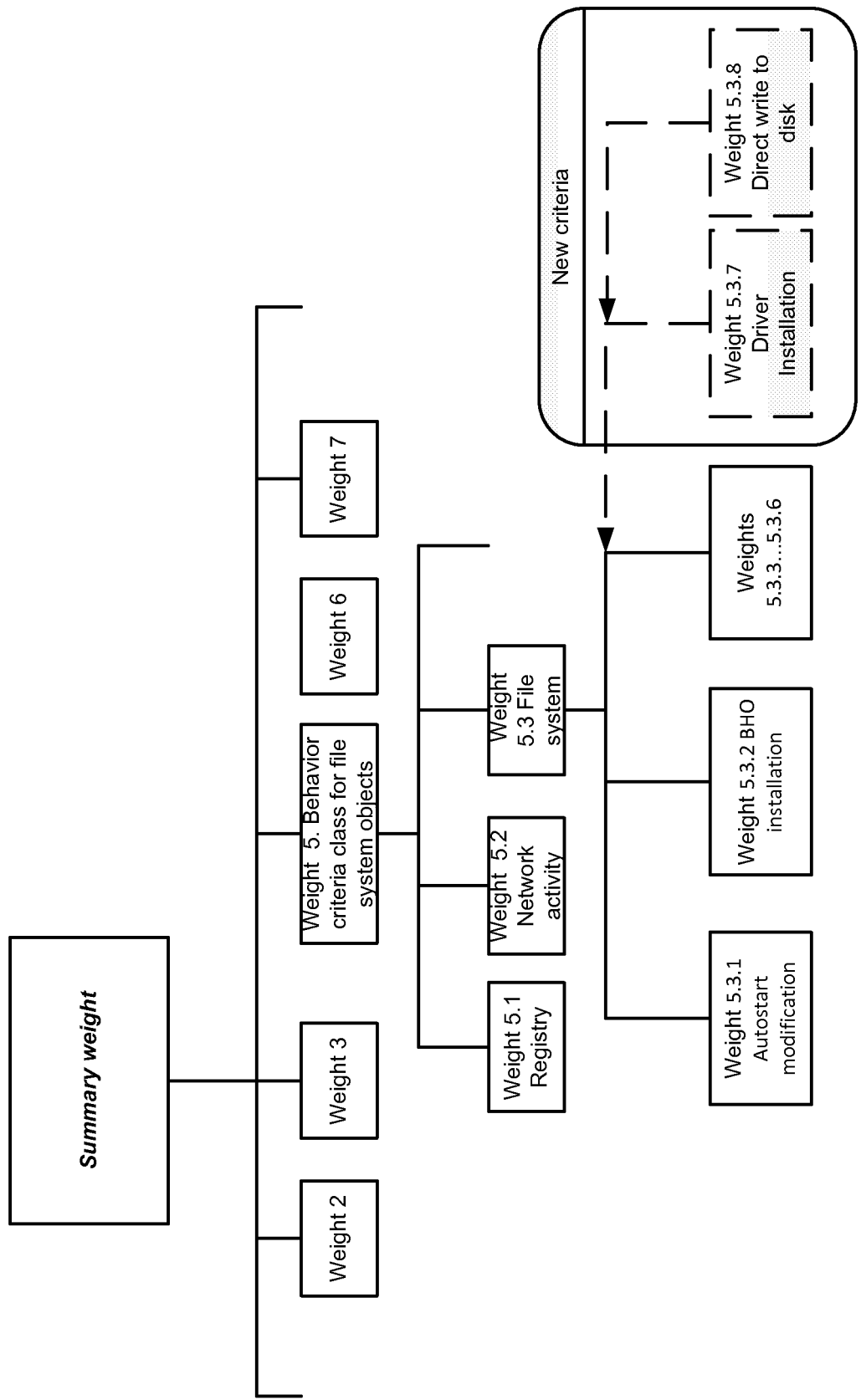
FIG. 5 illustrates a creation of new criteria according to one embodiment of the invention.

The decision tree can be easily expanded by adding new criteria which will improve the adequacy of the decisions made by the system. This feature of the invention is described in Example 4 and shown in FIG. 5.

Example 4

An update of the system for collection of statistical information has been completed. The system begins to receive new information regarding the behavior of various objects in the system. An addition of the two new criteria, "Driver Installation" and "Direct write to Disk", will lead to the modification of the decision tree, highlighted in FIG. 5.

After this modification of the decision tree, the maximum weight of the criterion 5.3 will not change. However, this criterion will become more informative and precise, which in turn will positively affect the quality of the decisions.

The following are several examples of the criteria the system uses to analyze the incoming information:

1) The ratio of clean to infected files packed by a given archiving program. Consider that in a stream of notification messages, the system received the information regarding 200 infected and 5 clean files compressed by a packer X. The decision making support subsystem (DSS, "http://en.wikipedia.org/wiki/Decision_support_system") arrives to the conclusion that the packer X is used to pack malicious files most of the time. The more infected are files the system receives in the incoming stream that were packed using the packer X, the higher the level of danger assigned to the files that were packed using the packer X. It should be noted that this is also true for the files that are not detected by the described system. The system also takes into account other relevant information about the file packers: an open source or commercially sold, digitally signed by a reputable software development company or unsigned custom-developed archiving software.

The system is intelligent enough not to automatically blacklist a host from which one or two malicious programs were downloaded. What matters is a ratio of "clean" to malicious files distributed by a particular host. For example, the system will not automatically blacklist a host mail.google.com after a user received a virus, originated at this host in his e-mail, among many other "clean" messages. On the other hand, if the ratio of "clean" to malicious files received from a particular host is skewed toward malicious files, the system concludes that the host primarily operates for distribution of malware.

2) The estimation of occurrence of certain words in the names of the file objects. The system extracts, from the names of the files, the words that are most often encountered in malicious objects. If one of these words is encountered in the name of a file object, the related criterion will be assigned the appropriate weight.

3) Another example is a file that has several extensions, the first one after the file name is a well known non-executable but popular extension, followed by a series of blank spaces. Such is an example of a filename where the filename criterion will be assigned the maximum weight: "Sex_Girls.avi.exe".

4) One effective criterion for detection of malicious objects is based on the detection of the same file under a multitude of different names. This is typical for malicious objects received by the system when the names of these objects have been generated randomly. While performing the analysis, the system eliminates from the selection the temporary files, since such behavior is characteristic of the temporary system files. In order to implement this elimination, the system uses the linking data and file creation data from the user's computer as follows:

If the file does not reside in a temporary directory and often has different names, this behavior is deemed suspicious.

Irrespective of the directory the file is in, if the linking status of the file is "recently linked", this is also deemed suspicious. The linking date is date when an exe file was created from the obj file. The linking date is a record in the file header and the antivirus program collects this information from the file header and forwards it to the KSN.

5) The file is executable, but has a "disguising" extension or does not have any extension at all. There is a multitude of malicious programs placed on different hosts with non-executable file extensions, such as jpg, bmp, avi, mp3, doc, xls, txt, css, etc, or without any extensions at all. Even if the user's firewall is turned on, it will not generate an alert while some program downloads a "picture" or "music". Some hosting services prohibit uploading of executable files, and the described file extension disguising tricks are used to circumvent these restrictions.

6) A malicious object has a name of a Windows system file (for example explorer.exe), but has been launched not from that the folder supposed to reside in the operating system.

Similar criteria have been developed for other types of objects analyzed by the system. All dangerous events are forwarded to the system for further analysis. Then the system uses a decision tree in order to make a decision regarding the subsequent automatic detection of the object.

The information on the events with a high level of activity, but low level of danger, is forwarded for analysis to the WhiteList service in order to supplement the data stored in the clean objects knowledge database. Being on a WhiteList can mean that the source of the software, or the type of the software, is the one that even without further checks, is not likely to contain a virus; in this case, the remainder of the anti-virus scan can be restricted to the more basic variety. If the software is neither on the BlackList nor the WhiteList, then a recommendation should be made to the user to make a scan with all available techniques.

On the other hand, being on a blacklist means that the newly downloaded software has a relatively high probability of containing a virus, either because the source of the software is a priori known to be a source of malware, or because earlier such software was frequently infected, or due to some other reasons.

Figure 6:
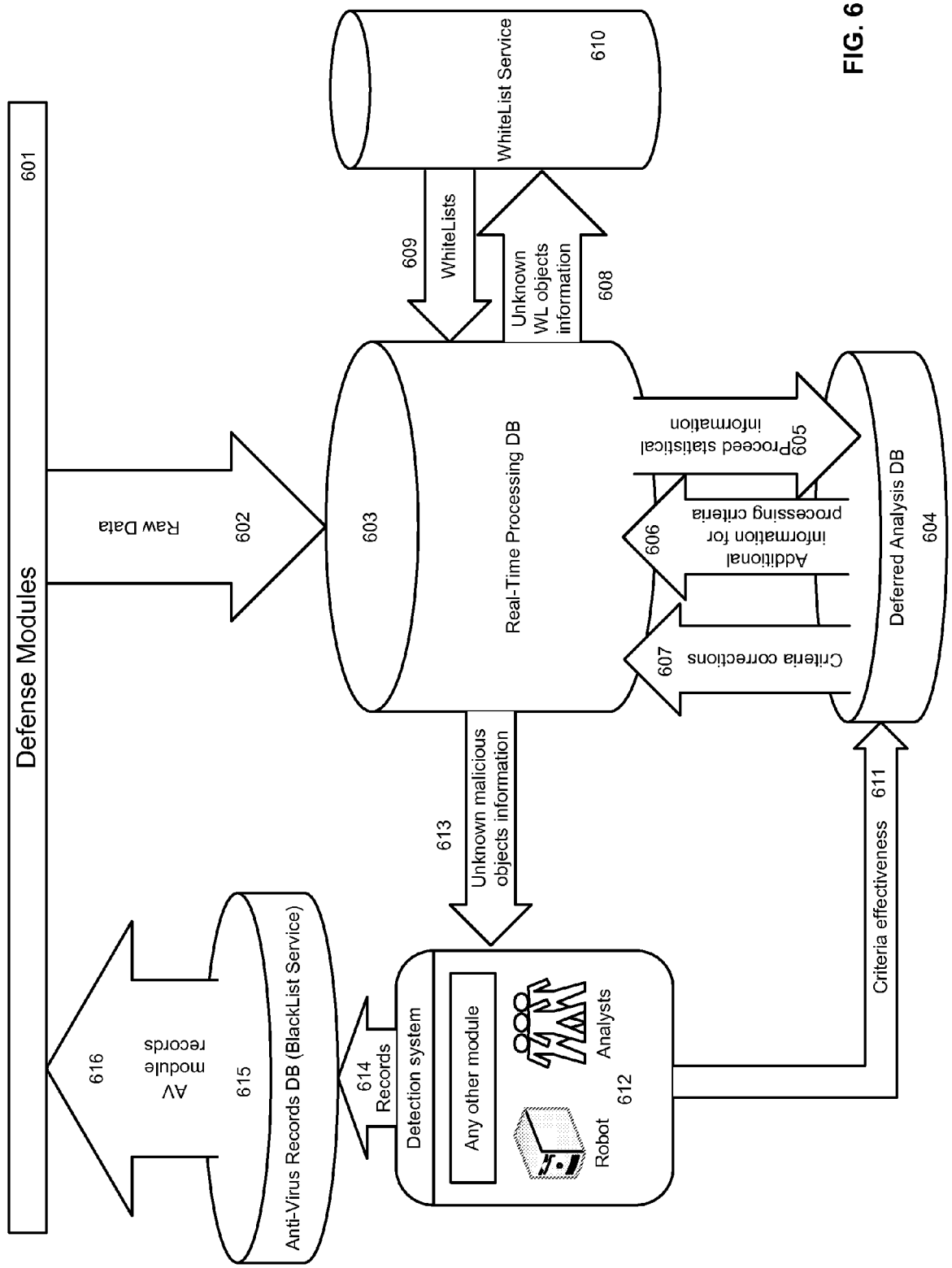
FIG. 6 illustrates the flow of data between the various components of one embodiment of the invention.

The system continuously performs the estimation of efficiency of all the risk assessment criteria it uses. The accuracy of the risk assessment criteria is dynamically adjusted on the previously performed risk assessment and empirical evaluation of the accuracy achieved. Other techniques used during the risk analysis and assessment are various heuristic detection algorithms, statistical analysis and creation and evaluation of composite risk assessment criteria. The decisions of the DSS system are regularly processed in a multi-dimensional database for estimation of efficiency of each of these criteria (which of these criteria should be trusted more, which of these criteria require corrective adjustments, etc.). This processing and various data streams circulating through the major components of the system, illustrating the feedback always maintained between the data in a stream of events and the data in the expert system (Inference Engine) are shown in FIG. 6. Raw data stream 602, collected from the users by the defense modules 601, is directed to the Real-Time Processing Database 603. The processed statistical information 605 is passed on to the Deferred Analysis Database 604. Deferred Analysis Database 604 returns the additional information processing criteria 606 and correction information 607 to Real-Time Processing Database 603.

There is a bidirectional information flow (streams 608 and 609) between and the Real-Time Processing Database 603 and the WhiteList Service 610. The information on unknown malicious objects 613 is forwarded from the Real-Time Processing Database 603 to the Detection system 612. The Detection system 612 performs automatic information processing or the services of skilled human analysts (Analysts) to process the information received on the unknown malicious objects 613. The resulting estimation of criteria effectiveness (stream 611) is passed to the Deferred Analysis Database 604 to enhance its processing capabilities. The detection system 612 passes the records (stream 614) of detected threats to the Anti-Virus Records Database 615. From the Anti-Virus Records Database 615 (BlackList Service), the anti-virus module records 616 are forwarded to the Defense Modules 601. False positives from a given criteria are used as a feedback for improving the system and result in reducing the relative significance of a criteria generating many false positives.

The knowledge databases also generate additional information used in the complex composite criteria, for example, for anticipatory (look-ahead) search for malicious Internet resources.

The above examples clearly show how the invention obviates the shortcomings of the existing prior art. The existing antivirus software analyzes the content of malicious software after the damage has already been done, or after the malware has been identified and became a known threat. Hours or days can lapse from the time malware is released before specialists have an chance to receive a file, analyze its content, create an antidote to remove it from the computers already infected and distribute it to users to protect computers not infected yet. During that time the malicious program may spread to millions of computers worldwide.

On the other hand, the proposed system, performs detection of unknown threats automatically and in real time, due to certain information about executable files (such as origin, filename, file extension(s), file size, etc.), Internet resources (such as lifespan, activity, etc.), or related events. The system identifies the unknown threats not only on the contents of the file, but based on statistical information collected from millions of users. It should be noted that the KSN does not collect any private information about the user according to the terms of the user agreement.

Once a file has been added to the BlackList, the antivirus software installed on the user's computer begins detecting the object as malicious and defending the user's computer from this malicious object. The user is notified by the antivirus program that malicious software has been detected. The antivirus software also blocks the user's access to domains and URLs that have been placed on the BlackList. With respect to domains the system also calculates a parameter called "Reputation" which shows a user a degree of danger associated with accessing a given Internet resource.

The system of the invention is capable of multistage analysis. Some files, events and resources are placed on WhiteList and BlackList as a result of automatic machine analysis. The remaining files may be analyzed during the subsequent second stage analysis with an aid of a human analyst, his/her knowledge and experience. The result of human analysis adds to the expert system's knowledge database maintaining white and black lists, and the machine and human analysis may work in tandem and complement each other in order to improve the accuracy of unknown threats detection.

As will be appreciated, other forms of detection for various other types of viruses are also contemplated. For example, delayed activation viruses can be detected not just based on the behavior, but also on their location in the system, presence of digital signature, presence of a packing, etc. For such cases, the DS-graph can be corrected, if needed.

Once an object is placed on the blacklist, it is then recognized as malicious by various antivirus/antispam/antimalware products, and can be removed, or blocked (in the case of a URL). The user can be informed of the discovery of a malicious object on his computer. Generally, one of the objectives is to increase the number of correct detections of malicious objects and to reduce the time needed for recognition of malicious objects.

Figure 7:
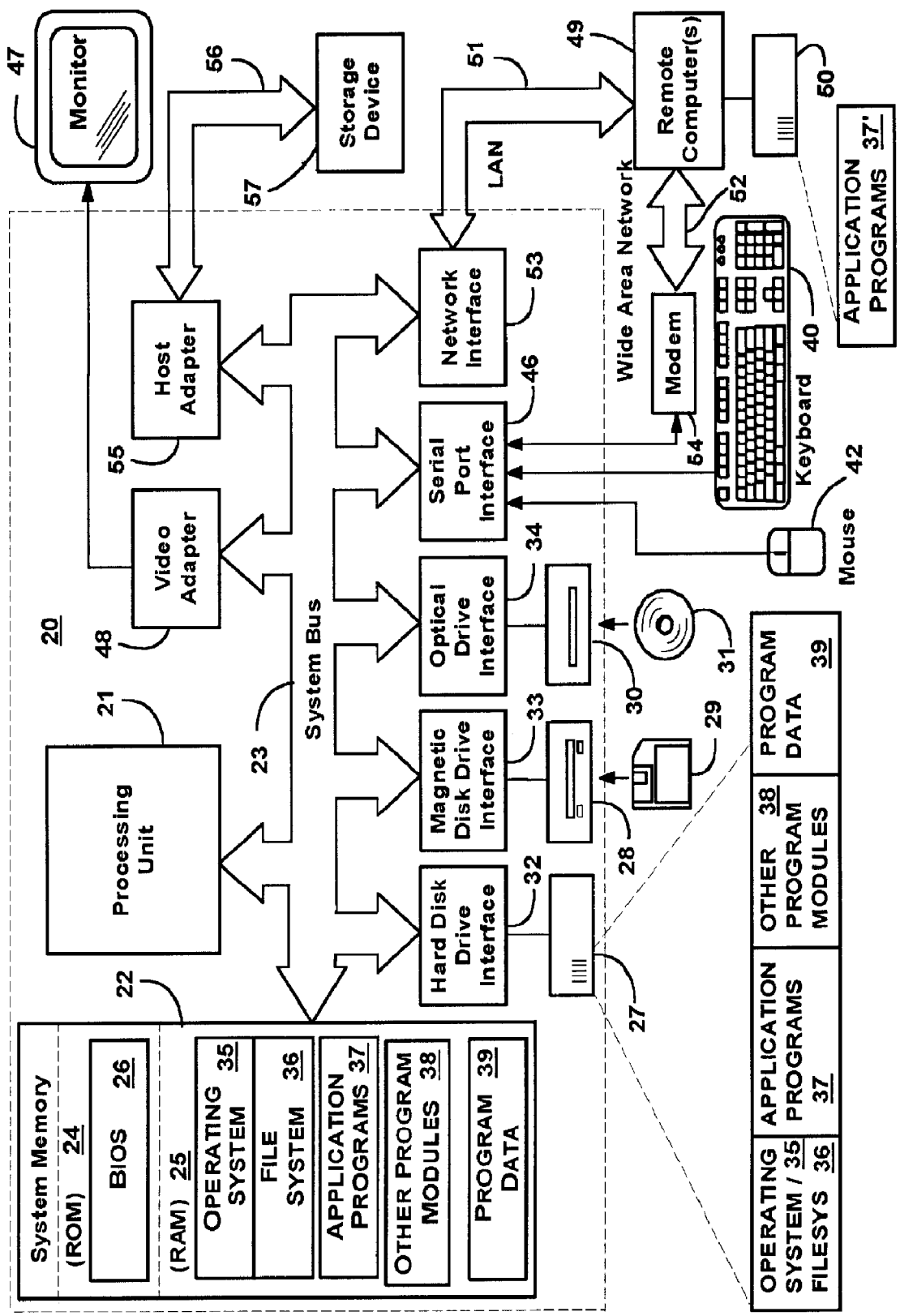
FIG. 7 illustrates a schematic of an exemplary computer system on which the anti-malware invention can be implemented.

With reference to FIG. 7, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and the associated computer-readable media provides non-volatile storage of computer readable instructions, data structures, program modules/subroutines, where each of the steps described above can be a separate module, or several steps can be aggregated into a single module, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, a magnetic disk 29, an optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through such input devices as a keyboard 40 and pointing device 42. Other input devices (not shown) may include a microphone, joystick, game pad, satellite dish, scanner or the like. These and other input devices are often connected to the processing unit 21 through a serial port interface 46 coupled to the system bus, and can be connected by other interfaces, such as a parallel port, game port or universal serial bus (USB). A monitor 47 or some other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be represented by another personal computer, a server, a router, a network PC, a peer device or other common network node, and includes many or all of the elements described relative to the personal computer 20, although only a memory storage device 50 has been illustrated. The logical connections include a local area network (LAN) 51 and a wide area network (WAN) 52. Such networking environments are common in offices, enterprise-wide computer networks, Intranets and the Internet.

When used in a LAN networking environment, the personal computer 20 is connected to the local network 51 through a network interface or adapter 53. When in a WAN networking environment, the personal computer 20 typically includes a modem 54 or other means for establishing communications over a wide area network 52, such as the Internet. The modem 54, which may be either internal or external, is connected to the system bus 23 via the serial port interface 46. In a networked environment, the program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A computer-implemented method for detection of previously unknown malware, the method comprising:
    (a) receiving event information and file metadata from a remote computer;
    (b) identifying whether the event information or the file metadata are indicative of known malware presence, indicative of unknown malware presence, or indicative of malware absence;
    (c) if the event information or the file metadata are indicative of known malware or indicative of malware absence, filtering out the event information and the file metadata to exclude them from further analysis;
    (d) performing a risk analysis and risk assessment for the remaining event information and the remaining file metadata so as to determine if the event and the file metadata are indicative of the previously unknown malware presence; and
    (e) performing a risk analysis and risk assessment wherein the risk analysis and risk assessment includes a construction of a "parent-child" hierarchy based on invocation sequence of the files, and wherein the risk assessed to the parent is based on the risk associated with the child,
    wherein the risk assessment includes construction of a Downloader-Starter graph.

2. The method of claim 1, wherein the file metadata comprises any of file name, file extension, file size, file linking status, whether the file is digitally signed, whether the file is a download utility, whether the file is packed, file source, file invocation frequency, file path, the URL from which the file was received and a port the file is accessing.

3. The method of claim 1, wherein the event information comprises any of behavioral patterns of an object associated with the event.

4. The method of claim 3, wherein the event information comprises any of statistical data associated with the event, name stability of the object source, IP address stability of the object source and activity of the object.

5. The method of claim 3, wherein the event information comprises the information on a type of the event including any of file downloading, file dropping and file linking.

6. The method of claim 1, wherein performing risk analysis and risk assessment includes construction of a decision tree.

7. The method of claim 1, wherein the risk analysis and risk assessment is performed automatically in real-time.

8. The method of claim 1, wherein a detection of previously unknown malware includes any of heuristic detection algorithms, statistical analysis, multi-dimensional database processing, dynamic adjustment of the accuracy of the risk assessment criteria based on the previously performed risk assessment and empirical evaluation of accuracy of the risk assessment criteria, composite risk assessment criteria and multiple stage risk assessment.

9. A non-transitory computer useable storage medium having computer executable program logic stored thereon, the computer executable program logic executed on a processor for implementing the steps of claim 1.

10. A computer system for detection of previously unknown malware, the computer system performing the functions of:
    (a) receiving event information and file metadata from a remote computer;
    (b) identifying whether the event information or the file metadata are indicative of the known malware, indicative of the unknown malware, or indicative of malware absence;
    (c) if the event information or the file metadata are indicative of known malware or indicative of malware absence, filtering out the event information and the file metadata to exclude them from further analysis;
    (d) performing a risk analysis and risk assessment for the remaining event information and the remaining file metadata to determine if the event and the file metadata are indicative of the previously unknown malware presence; and
    (e) performing risk analysis and risk assessment that includes a construction of a "parent-child" hierarchy based on the invocation sequence of the files, and wherein the risk assessed to the parent is based on the risk associated with the child,
    wherein the risk assessment includes construction of a Downloader-Starter graph.

11. The computer system of claim 10, wherein the file metadata comprises any of file name, file extension, file size, file linking status, whether the file is digitally signed, whether the file is a download utility, whether the file is packed, file source, file invocation frequency, file path, the URL from which the file was received and a port the file is accessing.

12. The computer system of claim 10, wherein the event information comprises any of behavioral patterns of an object associated with the event.

13. The computer system of claim 12, wherein the event information comprises statistical data associated with the event, name stability of the object source, IP address stability of the object source and activity of the object.

14. The computer system of claim 12, wherein the event information comprises information on the type of the event including any of file downloading, file dropping and file linking.

15. The computer system of claim 10, wherein performing risk analysis and risk assessment includes construction of a decision tree.

16. The computer system of claim 10, wherein the risk analysis and risk assessment is performed automatically in real-time.

17. The computer system of claim 10, wherein detection of the previously unknown malware includes heuristic detection algorithms, statistical analysis, multi-dimensional database processing, dynamic adjustment of the accuracy of the risk assessment criteria based on the previously performed risk assessment and empirical evaluation of accuracy of the risk assessment criteria, composite risk assessment criteria and multiple stage risk assessment.

* * * * *